F. STROHBACH.
MEANS FOR SEPARATING GASES FROM LIQUIDS.
APPLICATION FILED DEC. 30, 1911.
1,095,478.
Patented May 5, 1914.
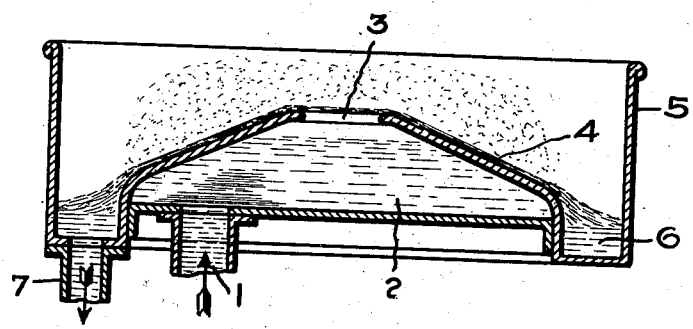
Witnesses:
Inventor,
Fritz Strohbach,
by
Att'y.

UNITED STATES PATENT OFFICE.

FRITZ STROHBACH, OF CHARLOTTENBURG, GERMANY, ASSIGNOR TO GENERAL ELECTRIC COMPANY, A CORPORATION OF NEW YORK.

MEANS FOR SEPARATING GASES FROM LIQUIDS.

1,095,478. Specification of Letters Patent. Patented May 5, 1914.

Application filed December 30, 1911. Serial No. 668,684.

*To all whom it may concern:*

Be it known that I, FRITZ STROHBACH, a subject of the Emperor of Germany, residing at Charlottenburg, Germany, have invented certain new and useful Improvements in Means for Separating Gases from Liquids, of which the following is a specification.

This invention relates to apparatus for separating out gaseous components from a fluid mixture, the other part of which is liquid.

The object of the invention is to effectively separate the gas from the liquid with a minimum expenditure of energy and in such a manner that the gas is not reabsorbed by the liquid. This object is attained by conveying the fluid mixture at a low velocity of flow and in comparatively thin films or streams over large surfaces so that the gas contained in the mixture has time and opportunity to escape from the liquid without being afterward carried along by the liquid as it flows away.

The accompanying drawing is a sectional view showing one illustrative form of apparatus for carrying out the invention.

The fluid mixture to be deprived of gas, for example, the discharge from a throwing water air pump, is delivered by the conduit 1 at a relatively low velocity to the bottom of the chamber or receptacle 2 and passes out of the opening 3 at the top of the chamber. From the opening 3 it flows outwardly over the downwardly inclined conical surface of the wall 4 which forms the upper wall of the chamber and part of the lower wall of the tank 5. The inclination of the wall 4 is comparatively small and the fluid flows slowly over it in a thin, continuous sheet or film. The air separates from the liquid as the mixture flows slowly downward with but slight, if any, change of direction and the liquid passes with little or no disturbance into the annular basin 6 formed at the bottom of the tank or receptacle 5 adjacent to the point where the water leaves the surface of the cone. The air rises from the flowing fluid and passes out of the top of the tank and the water collected in the basin 6 is removed by the conduit 7. There is no contact of the separated air with the water as each passes from the apparatus and consequently no opportunity is afforded for the air to be reabsorbed by the water as is the case in devices where the water falls in a sheet or spray and the separated air as it passes out comes into contact with the falling water. The apparatus also consumes less energy than other forms in which the fluid mixture is delivered at high velocity in such a manner that the water undergoes a sudden change of direction and the inertia of the air particles assisted by their low specific weight causes them to separate out.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. A device for removing occluded gases from a liquid consisting of a tank having a conical member extending upward from the base thereof and having an opening at its apex, said conical member being of lesser diameter at its base than said tank thereby forming an annular chamber around the outer portion of said tank, the base of said tank having an opening within the outer edge of said conical member for the admission of liquid and an opening between the edge of said conical member and the side wall of said tank for the exit of liquid.

2. A device for removing occluded gases from a liquid, consisting of a substantially conical chamber having an opening in the conical part of its wall, a tank receiving the overflow from the cone, and inlet and outlet pipes, as described.

3. A device for removing occluded gases from a liquid, comprising a horizontal chamber having a substantially conical top with a central opening therein, a tank at the bottom of the cone receiving the overflow from the cone, and inlet and outlet pipes, as described; whereby the liquid may flow down the wall of the cone in a thin and undisturbed sheet, while the released gases pass upward, thus removing them from further contact with the liquid.

In witness whereof, I have hereunto set my hand this 13 day of December, 1911.

FRITZ STROHBACH.

Witnesses:
 ERICK ÛBERLÉE,
 OSCAR EBERTH.